No. 868,118. PATENTED OCT. 15, 1907.
R. D. PARDEE.
CREDIT ACCOUNTING APPLIANCE.
APPLICATION FILED AUG. 11, 1906.
2 SHEETS—SHEET 1.
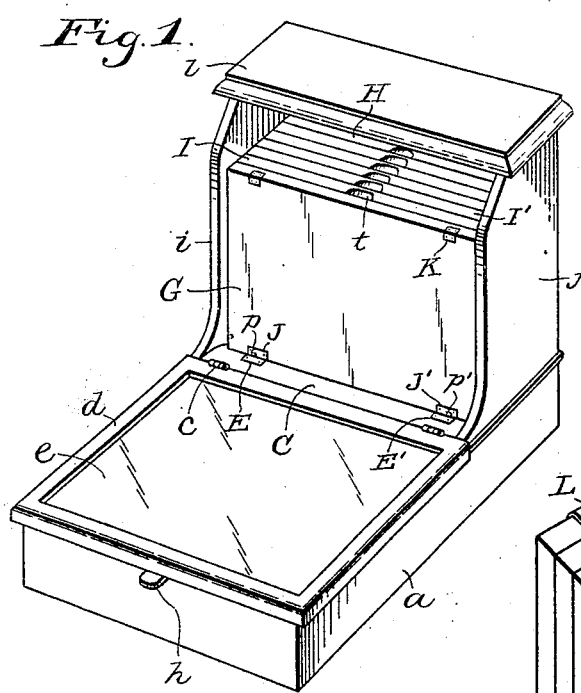
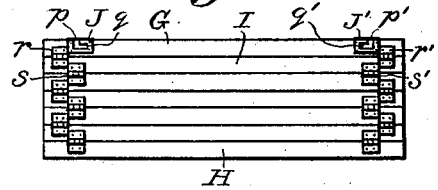
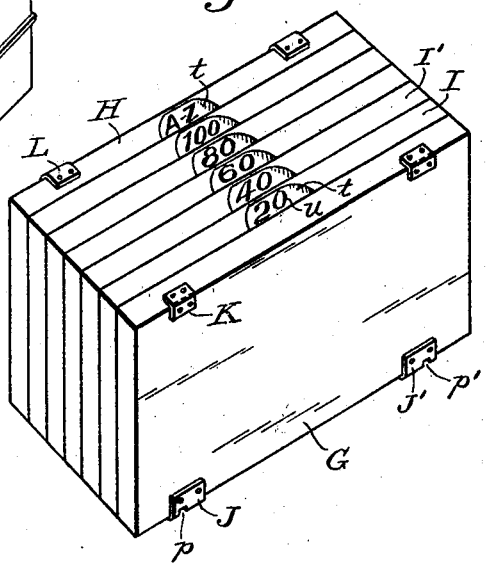
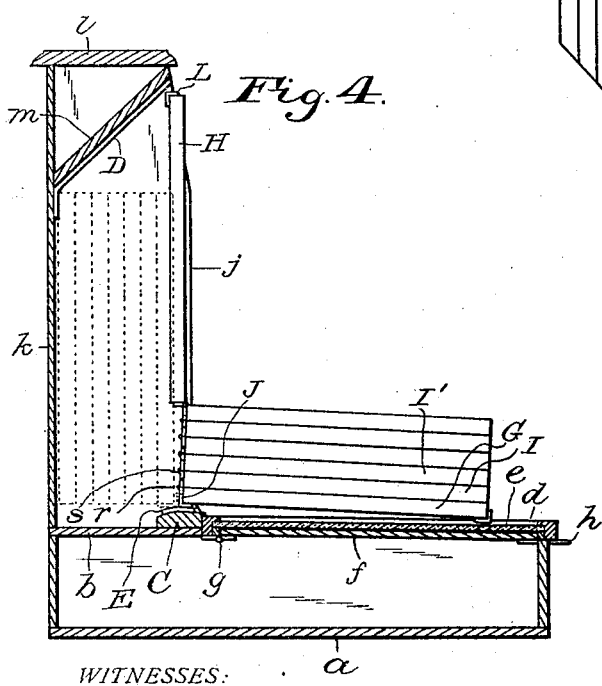
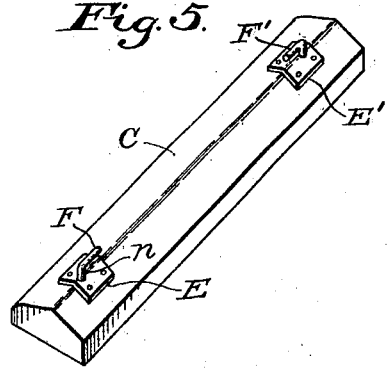
WITNESSES:
R. D. Fisher
Stella Snider
INVENTOR:
Rollin D. Pardee,
BY E. T. Silvius,
ATTORNEY.

No. 868,118. PATENTED OCT. 15, 1907.
R. D. PARDEE.
CREDIT ACCOUNTING APPLIANCE.
APPLICATION FILED AUG. 11, 1906.
2 SHEETS—SHEET 2.
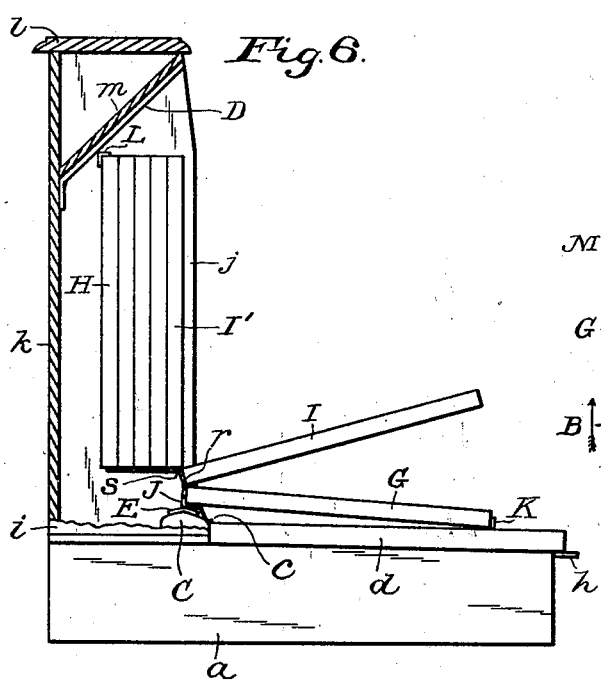
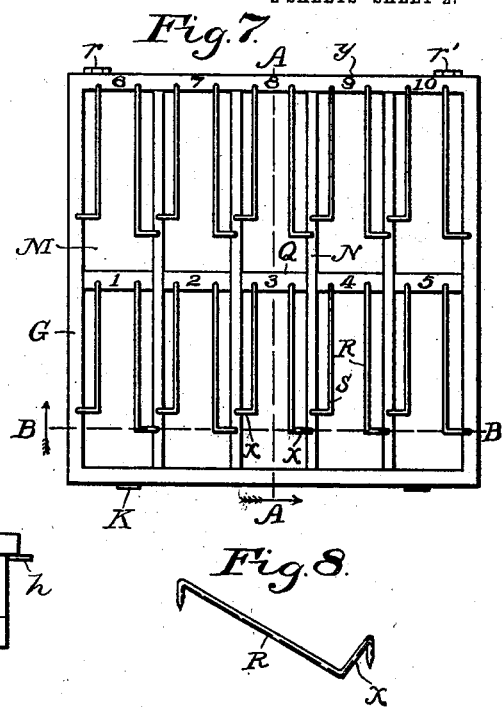
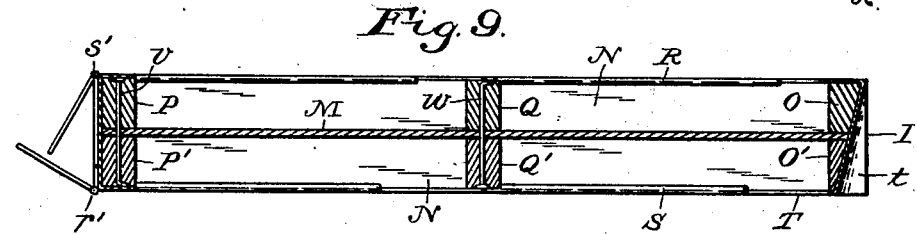
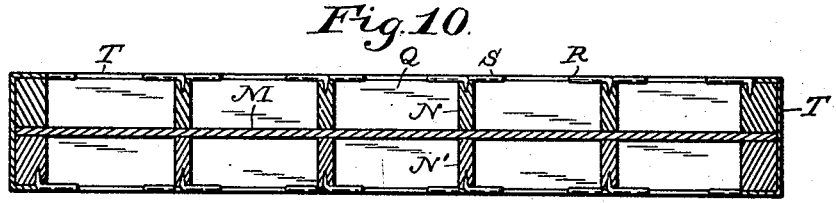
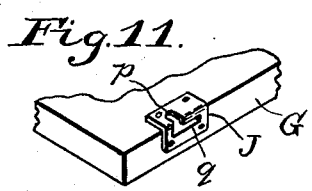
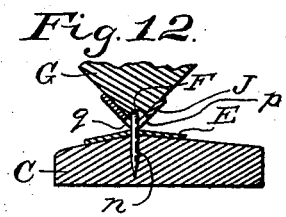
WITNESSES:
R. D. Fisher
Stella Snider
INVENTOR:
Rollin D. Pardee,
BY
E. T. Silvius,
ATTORNEY.

UNITED STATES PATENT OFFICE.

ROLLIN D. PARDEE, OF GARRETTSVILLE, OHIO, ASSIGNOR TO THE McCASKEY REGISTER COMPANY, OF ALLIANCE, OHIO, A CORPORATION OF OHIO.

CREDIT-ACCOUNTING APPLIANCE.

No. 868,118.      Specification of Letters Patent.      Patented Oct. 15, 1907.

Application filed August 11, 1906. Serial No. 330,187.

*To all whom it may concern:*

Be it known that I, ROLLIN D. PARDEE, a citizen of the United States, residing at Garrettsville, in the county of Portage and State of Ohio, have invented new and useful Improvements in Credit-Accounting Appliances; and I do declare the following to be a full, clear, and exact description of the invention, reference being had to the accompanying drawings, and to the letters and figures of reference marked thereon, which form a part of this specification.

This invention relates to apparatus forming parts of the mechanical features of a credit-accounting system, the apparatus being designed to hold in systematic order duplicates of all bills or credit sales slips given by merchants with sales of merchandise on credit account, the apparatus having also other uses for filing papers, and the invention has particular reference to bill-holding cabinets and bill-holders thereof in which the bills may be filed and kept systematically indexed for future reference, as original entries of transactions, without requiring the use of account books with the uncertainties of copying transactions into them.

Objects of the invention are, first, to provide convenient appliances or apparatus of simple and relatively cheap construction, for the use of those who may not require the more extensive and elaborate filing facilities for preserving valuable papers; second, to provide simple and compact credit-accounting appliances, which may be manufactured and supplied at the minimum cost, for meeting the needs of merchants who may do a relatively small credit business, and for the use of others who may desire relatively inexpensive filing cabinets for their papers; and, third, to provide compact filing leaves or bill-holders adapted to be conveniently removed from their cabinets and placed with their contents in fire-proof safes.

With the above-mentioned and minor objects in view, the invention consists in a filing cabinet of improved construction provided with bill-holding leaves or frames of novel construction and supported removably in the cabinet casing in a novel manner, there being a plurality of leaves hinged together, and the foremost or front leaf normally supporting all of the remaining leaves in the casing in a novel manner so that the weights of the leaves by gravity will hold the leaves in upright positions when so placed, without the use of balancing springs; and, the invention consists further in the novel parts and the combinations and arrangements of parts, as hereinafter particularly described and claimed.

Referring to the drawings Figure 1 is a perspective view of the improved credit-accounting cabinet; Fig. 2, a bottom plan view of the bill-holding leaves, showing the arrangements of the hinges that hold them together portably; Fig. 3, a perspective view of the leaves; Fig. 4, a vertical sectional view of the cabinet at the left-hand side of the leaves, all but one of the leaves being horizontal on the desk part of the cabinet, and the remaining leaf being vertical, dotted lines indicating the positions of all of the leaves when closed in upright positions; Fig. 5, a perspective view of the base to which the leaves are connected in the casing; Fig. 6, a side elevation of the cabinet with parts thereof broken away and showing the leaves in various positions; Fig. 7, a plan of the inner or rear side of the front and other bill-holding leaves except the rear leaf which has its front only arranged to hold bills, the front leaf having only its rear side arranged to hold bills, while the intervening leaves are adapted to hold bills on both front and rear sides thereof; Fig. 8, a perspective view of one of the guards for holding the bill slips in the pockets of the leaves; Fig. 9, a longitudinal sectional view of either one of the intermediate leaves taken as on the plane of the line A—A in Fig. 7; Fig. 10, a transverse sectional view of either one of the intervening leaves taken as on the plane of the line B—B in Fig. 7; Fig. 11, a fragmentary perspective view showing a corner of the forward leaf and device attached thereto for connecting the leaf to the supporting base in the casing; and, Fig. 12, a fragmentary sectional view showing the connections which hold the forward leaf to the base.

Similar reference characters in the several figures of the drawings designate corresponding elements or features of construction.

In the drawings *a* designates the base or desk part of the cabinet having a top *b* on the rear part thereof serving as a bottom for the casing in which the bill-holding leaves are arranged, there being a base C and hinges *c* at the forward edge of the top *b* connecting thereto a lid *d* having a glass panel *e*, there being a leaf *f* connected to the lid *d* by hinges *g* and provided with a finger-hold *h*. The casing part of the cabinet comprises two sides *i* and *j*, a back *k* and a top *l*. Substantially the same construction has been heretofore used and requires no further description.

In the present invention the upper part of the casing is provided with an inclined guide comprising a plate, board or block *m* having a front face extending from the back *k* upwardly and forwardly towards or to the top *l* and provided with a smooth face plate or strip D, or a plurality of strips, against which the upper rear edge of the rear bill-holding leaf may slide, for keeping the rearmost leaves in upright positions while one or more of the leaves may swing down upon the lid of the desk part. The inclined guide also serves to assist the leaves in gravitating to their lowest levels when being placed in upright positions.

For connecting the bill-holding leaves removably to the casing, the base C is preferably employed as a convenient element and is provided on its top with a pair of bearing plates E and E′ above which hinge-pins F and F′ are supported by stems n that extend through the plates into the base.

A set of bill-holding leaves comprises any suitable number, there being a front leaf G, a rear leaf H like the front leaf, with plain or ornamental outer sides, and a plurality of intermediate leaves, as I and I′, of identical construction adapted to hold slips of paper on both front and rear sides thereof. The front leaf G is provided at its lower forward edge with a pair of bearing pieces J and J′ that are annular in shape and extend against the front and bottom of the leaf and are secured thereto, the pieces having slots p and p′ in the angles thereof, to clear the stems n of the hinge-pins, and slots q and q′ extending from the slots p and p′ in the parts of the pieces that extend under the bottom of the leaf to clear the hinge-pins, so that the leaf may be connected to the hinge-pins or disconnected therefrom when the leaf is in upright position only, the edge of the leaf being cut away behind the bearing piece to clear the hinge-pin. The bearing pieces normally rest upon the bearing plates as sliding contact supports, while serving with the hinge-pins as pivotal connections for the front leaf and indirectly for the other leaves which are connected together and normally supported by the front leaf, the leaf I having its lower forward edge connected by hinges r and r′ to the lower rear edge of the leaf G, the lower rear edge of the leaf I being connected to the lower forward edge of the leaf I′ by hinges s and s′, and the lower forward edge of the rear leaf H being likewise connected by hinges to the lower rear edge of the rearmost intermediate leaf, all of the leaves being thus grouped with their edges flush so that they together are of rectangular form, and all of the leaves thus grouped may be retained upright by gravity in the casing, leaning against the back thereof while supported at the lower forward edge of the front leaf, or all of the leaves may lie together on the lid d with the leaves in the same relative order one upon another. Also the leaves may swing apart similarly to the leaves of other bill-files, or as seen in Figs. 4 and 6. The upper forward edge of the leaf G is provided with guard-pieces K, and the upper rear edge of the leaf H is provided with contact-pieces L that are adapted to slide against the guide strips D during vertical movements of the leaves. The frames of the leaves are of considerable thickness, and the upper ends of all except the front leaf has each a beveled part t on which is an index number or character u, the beveled part serving as finger clearance space so that the operator may place a finger therein to engage and draw forward the adjacent forward leaf.

The leaves I or I′ are each composed of a bottom plate M of suitable material to the opposite sides of which are secured strips forming partitions N and N′ and framing O and O′, and P and P′; and also partitions Q and Q′, the framing and partitions being attached to the bottom plate preferably by clenched brads v or w and forming with the bottom plate a suitable number of pockets to receive the bill-slips, each pocket being provided at its front with a pair of guards R and S formed of wire and having each a lateral branch x, the ends of the guards being secured to the partitions or side parts of the framing of the leaves and extending partially across the otherwise open tops of the pockets, so that slips may be placed in the pockets under the guards and retained against accidental dislodgment. The rear side of the front leaf G and the front side of the rear leaf H are likewise provided with pockets and guards, and the pockets have suitable index characters y suitably arranged thereat. The outer sides of the leaves have a suitable ornamental covering T which may be composed of various material glued or pasted to the leaves.

In practical use it is customary, in selling merchandise at retail on credit, to write a bill or invoice of the goods with prices thereof, carrying forward any balance that may be due and making a footing showing new balance due, at the same time making a carbon copy of the bill to be given to the customer, and the merchant should then place the original bill in a suitable pocket in one of the bill-holding leaves of the above-described cabinet where all subsequent bills should be also placed until settlement shall have been made of the account. In this system no additional entries in books are necessary. The bill-slips may be placed in the pockets by pushing them endwise under the ends of the guards. When a leaf is drawn forward so that the pockets may be reached the leaf will so remain until pushed up nearly to an upright position when the weight of the leaf or additional leaves connected thereto will hold it in an upright position, by reason of the center of gravity of each leaf being rearward of the point of its support. When desired to remove the leaves from their casing they may be readily lifted from the hinging connections of the forward leaf with the base while the leaves are in upright positions.

Having thus described the invention, what is claimed as new is—

1. Credit-accounting appliances including a plurality of hinged bill-holding frames each comprising a bottom plate, partitions on the bottom plate to form pockets, and guards attached to the tops of the partitions and extending partially over the pockets, each pocket having two guards, one at either side thereof, and each guard extending partially over an end of the pocket.

2. Credit-accounting appliances including a portable group of bill-holding frames hinged together and comprising each a bottom plate and strips secured to the bottom plate to form pockets, there being a plurality of pockets on each frame with closed bottoms, each pocket having a guard extending partially over one side thereof and a relatively shorter guard extending partially over the opposite sides thereof, said guards extending to one end of the pocket, each guard being secured to two of said strips, each one of said pockets being unobstructed at the front of one end thereof.

3. Credit-accounting appliances including a case, a pair of bearing plates in the case having each a stem extending vertically from the top thereof, each stem having a horizontal hinge-pin formed thereon, and a bill-holding leaf provided with a pair of bearing pieces that are angular in shape and extend against two faces of the leaf, the bearing pieces having each a slot in the angle thereof to clear the stem of the hinge-pin, and another slot extending horizontally therefrom in the part of the bearing piece that extends under the bottom of the leaf to clear the hinge-pin, said bearing pieces normally resting upon said bearing plates.

4. Credit-accounting apparatus including a case, an inclined guide fixed in the case, a pair of pivotal supports mounted on the bottom of the case, a plurality of bill-holding leaves hinged one to another, the foremost one of said leaves being pivotally mounted on said pivotal supports and normally supporting the other leaves in upright positions, and the rearmost one of said leaves normally resting against said inclined guide.

5. Credit-accounting apparatus including a case, an inclined guide fixed in the case, pivotal supports mounted on the bottom of the case, a plurality of bill-holding leaves hinged one to another, the foremost one of said leaves being pivotally mounted on said supports, and a contact-piece secured to the rearmost one of said leaves to engage said guide.

In testimony whereof, I affix my signature in presence of two witnesses.

ROLLIN D. PARDEE.

Witnesses:
L. W. LEWIS,
J. J. BROWN.